United States Patent
Ni

(10) Patent No.: US 9,248,604 B2
(45) Date of Patent: Feb. 2, 2016

(54) APPARATUS FOR STRIPPING RELEASE PAPER FROM WORKPIECE

(71) Applicants: FU DING ELECTRONICAL TECHNOLOGY (JIASHAN) CO., LTD., Zhejiang (CN); HON HAI PRECISION INDUSTRY CO., LTD., New Taipei (TW)

(72) Inventor: Jie Ni, Jiashan (CN)

(73) Assignees: FU DING ELECTRONICAL TECHNOLOGY (JIASHAN) CO., LTD., Zhejiang (CN); HON HAI PRECISION INDUSTRY CO., LTD., New Taipei (TW)

( * ) Notice: Subject to any disclaimer, the term of this patent is extended or adjusted under 35 U.S.C. 154(b) by 143 days.

(21) Appl. No.: 14/106,804

(22) Filed: Dec. 15, 2013

(65) Prior Publication Data

US 2014/0174671 A1 Jun. 26, 2014

(30) Foreign Application Priority Data

Dec. 24, 2012 (CN) .................... 2012 2 07178849 U

(51) Int. Cl.
- *B32B 38/10* (2006.01)
- *B29C 63/00* (2006.01)
- *B32B 43/00* (2006.01)

(52) U.S. Cl.
CPC ........... *B29C 63/0013* (2013.01); *B32B 43/006* (2013.01); *Y10T 156/1132* (2015.01); *Y10T 156/1179* (2015.01); *Y10T 156/1944* (2015.01); *Y10T 156/1983* (2015.01); *Y10T 156/1994* (2015.01)

(58) Field of Classification Search
CPC .. B32B 38/10; B32B 43/006; B29C 63/0013; Y10T 156/1179; Y10T 156/1983; Y10T 156/1994; Y10T 156/1132; Y10T 156/1944
See application file for complete search history.

(56) References Cited

U.S. PATENT DOCUMENTS

| | | | |
|---|---|---|---|
| 3,889,563 A * | 6/1975 | Westermann | 83/124 |
| 6,102,268 A * | 8/2000 | Raveleau | 225/103 |
| 6,997,363 B1 * | 2/2006 | Vossen | 225/93 |
| 7,360,475 B2 * | 4/2008 | Quercia | 83/111 |
| 2009/0272499 A1 * | 11/2009 | Quercia | 156/584 |

* cited by examiner

*Primary Examiner* — Mark A Osele
(74) *Attorney, Agent, or Firm* — Novak Druce Connolly Bove + Quigg LLP

(57) ABSTRACT

An apparatus configured for stripping a release paper from a workpiece, including a base defining a through hole, a pushing mechanism mounted on the base adjacent to the through hole; and a stripping mechanism mounted on the base. The stripping mechanism includes a bracket mounted on the base, a driving member mounted on the base away from the pushing mechanism and abutting the through hole, a pushing member connected to the driving member towards the through hole, and an suction assembly including an suction driving member fixedly-connected to the bracket and an suction member connected to the suction driving member. The driving member enables the pushing member to extend into the through hole for clamping the release paper between the pushing member and the pushing mechanism, and the suction member is capacity of sucking and moving the workpiece.

12 Claims, 6 Drawing Sheets

APPARATUS FOR STRIPPING RELEASE PAPER FROM WORKPIECE

BACKGROUND

1. Technical Field

The present disclosure generally relates to a stripping device, and particularly to an apparatus for stripping release papers from workpieces applied during production.

2. Description of the Related Art

Release papers are usually adhered to workpieces for protecting the workpieces from damage in transport, and twin adhesives with release papers are adhered to workpieces for assembling with other structures in assembly. The release papers are usually manually stripped off from the workpieces. However, efficiency of the manual way is relatively low.

Therefore, there is room for improvement within the art.

BRIEF DESCRIPTION OF THE DRAWING

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
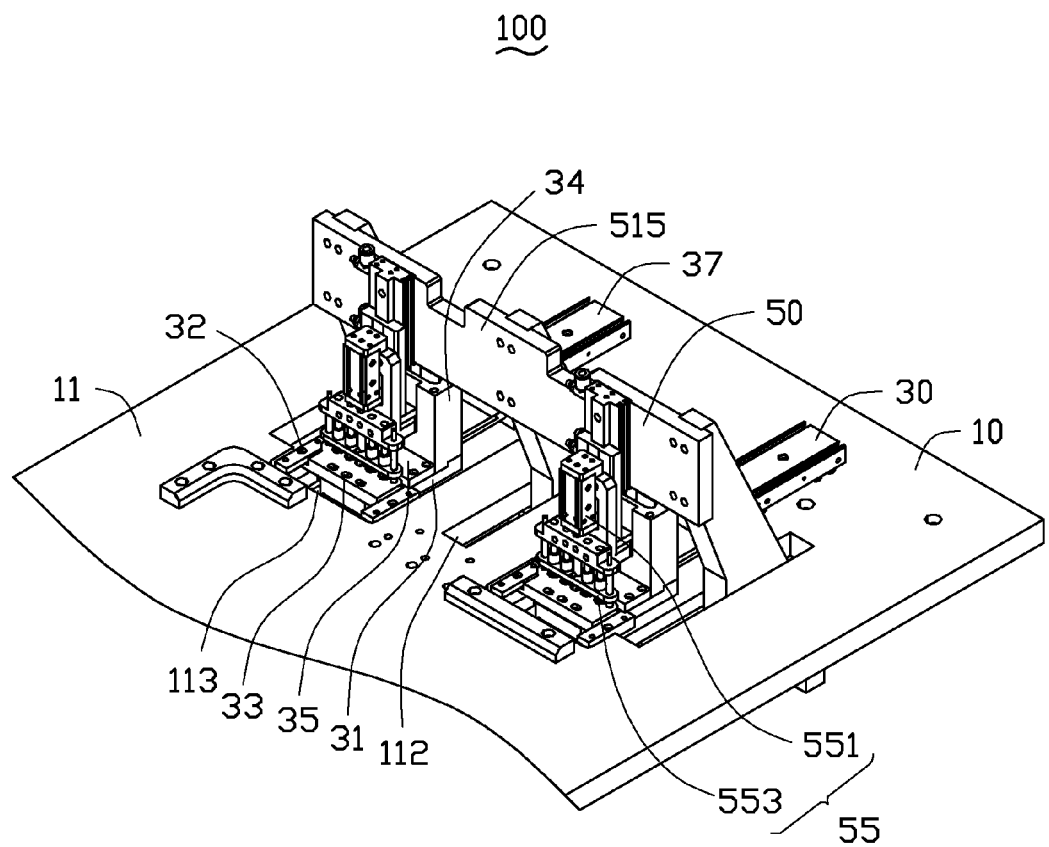
FIG. 1 shows an assembled, isometric view of an apparatus having a pair of pushing mechanisms.
Figure 2:
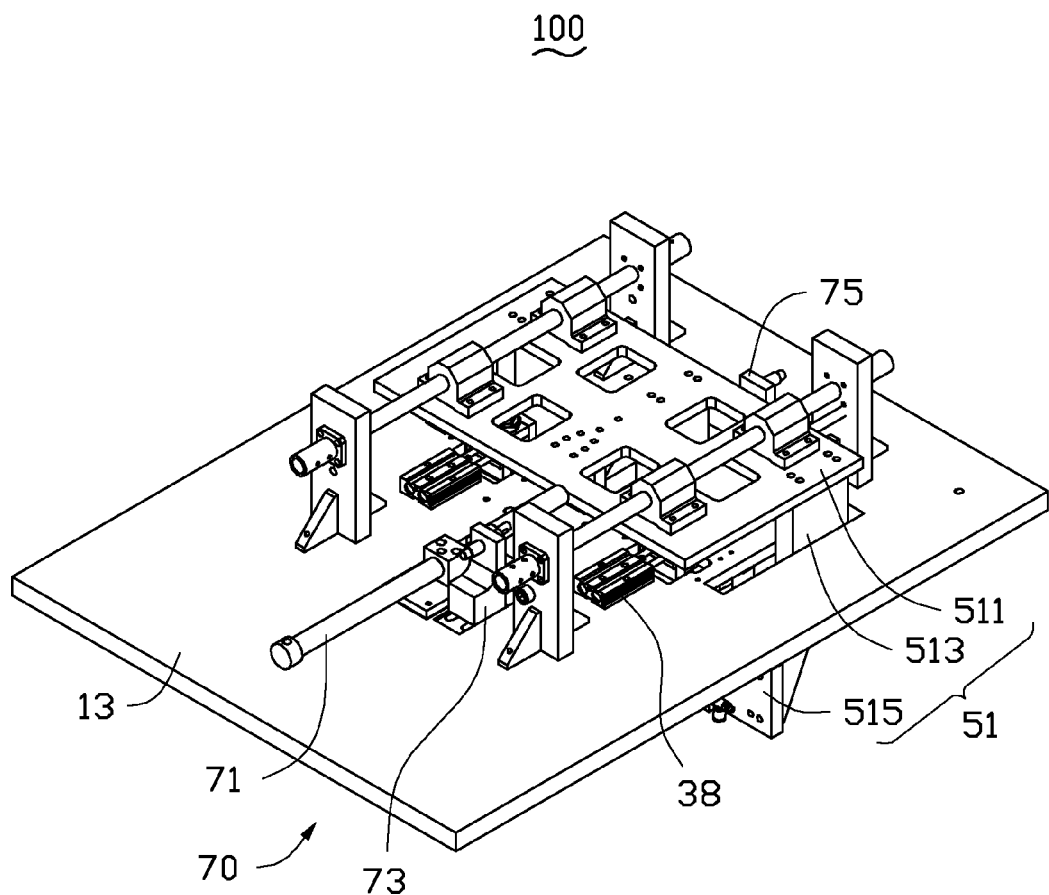
FIG. 2 is similar to FIG. 1, but from another aspect.
Figure 3:
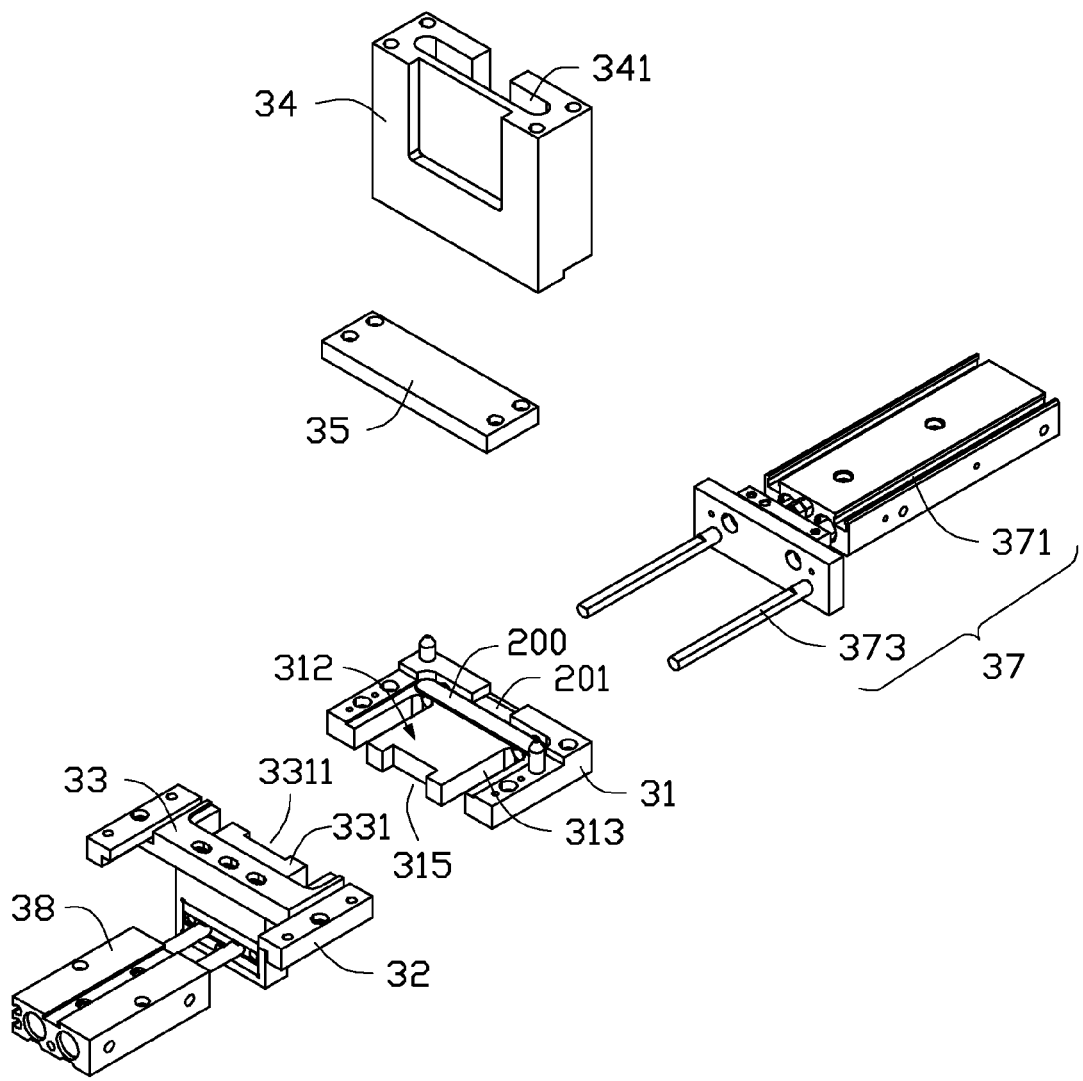
FIG. 3 shows an exploded view of the pushing mechanism of FIG. 1.

FIGS. 1 through 3 show an apparatus 100 configured for stripping a release paper 201 from a workpiece 200 and transporting the workpiece 200 to a next workstation (not shown). The stripping device 100 includes a base 10, a pair of pushing mechanisms 30, a stripping mechanism 50, and a transporting mechanism 70. The pushing mechanisms 30, the stripping mechanism 50, and the transporting mechanism 70 are mounted on the base 10. The pushing mechanisms 30 push the workpiece 200 to the stripping mechanism 50. The stripping mechanism 50 moves relative to the base 10 for clamping the release paper 201 between the pushing mechanisms 30 and the stripping mechanism 50. The workpiece 200 moves together with the stripping mechanism 50, such that the release paper 201 is stripped off from the workpiece 200. The transporting mechanism 70 transports the workpiece 200 to the next workstation.

The base 10 includes a first installation surface 11 and a second installation surface 13 opposite to the first installation surface 11. Three guiding holes 112 are separately defined in the first installation surface 11 and are arranged in line. Two through holes 113 are defined in the first installation surface 11. Each through hole 113 is positioned between two neighboring guiding holes 112.

Figure 4:
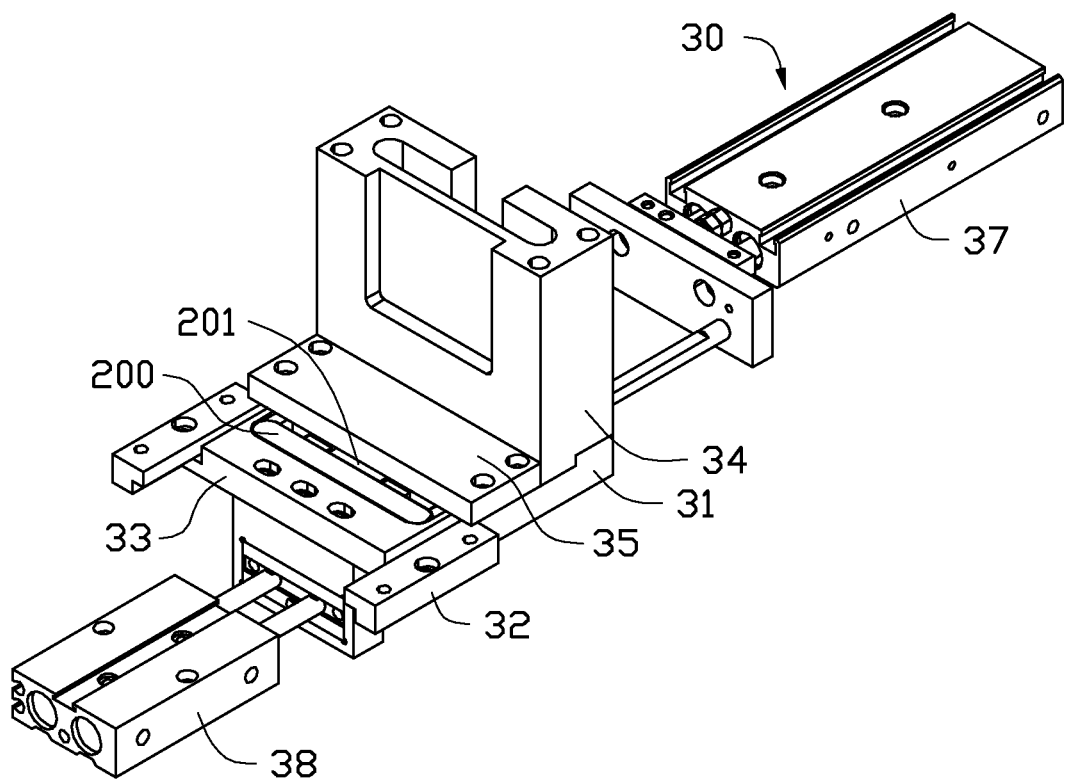
FIG. 4 shows a working state for the pushing mechanism of FIG. 3.

FIG. 4 shows that the two pushing mechanisms 30 are separately mounted on the first installation surface 11. Each pushing mechanism 30 includes a supporting member 31, two guiding rails 32, a slider 33, a guiding member 34, a resisting member 35, a first driver 37, and a second driver 38. The supporting member 31 is fixedly installed on the first installation surface 11 between the two neighbored guiding holes 112. A first guiding groove 312 is recessed in a top surface of the supporting member 31 away from the base 10. Two penetrating holes 313 are defined in one side surface of the supporting member 31. A first recessing groove 315 is defined in other side surface of the supporting member 31 and communicates with the first guiding groove 312. The penetrating holes 313 extend to the side surface of the supporting member 31 defining the first recessing groove 315.

The two guiding rails 32 are mounted on the first installation surface 11 adjacent to the supporting member 31 in parallel and respectively positioned at two sides of the through hole 113. The slider 33 is movably mounted on the two guiding rails 32 above the through hole 113, and abuts the first recessing groove 315. A second guiding groove 331 is defined in a side surface of the slider 33 away from the first installation surface 11, corresponding to the first guiding groove 312. A second recessing groove 3311 is defined in the slider 33 adjacent to the supporting member 31 corresponding to the first recessing groove 315. The guiding member 34 is fixedly positioned on the supporting member 31 above the guiding groove 312 and positioned at one side of the first recessing groove 315 away from the slider 33. A receiving portion 341 is defined in the guiding member 34 to receive stacked workpieces 200, for dropping the stacked workpieces 200 into the first guiding groove 312.

The resisting member 35 is fixedly mounted on the supporting member 31 adjacent to the guiding member 34 above the first and second recessing grooves 315, 3311. The first driver 37 is fixed on the first installation surface 11, and is positioned at one side of the supporting member 31 away from the slider 33. The first driver 37 includes a driving body 371 and two pushing posts 373 movably connected with the driving body 371. The driving body 371 is fixedly-positioned on the first installation surface 11. Each pushing post 373 movably passes through one corresponding penetrating hole 313, pushing the workpiece 200 to the second guiding groove 331. The second driver 38 is mounted on the second installation surface 13 and is connected to the slider 33, moving the slider 33 relative to the guiding rails 32.

Figure 5:
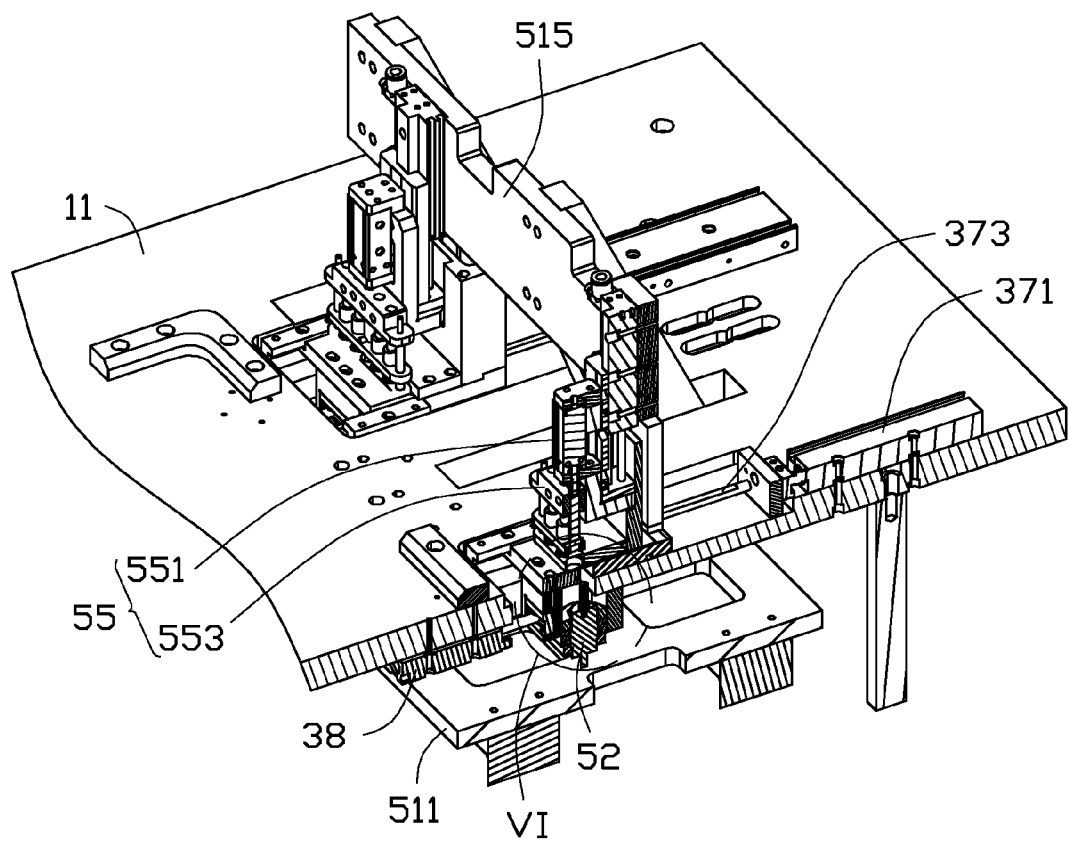
FIG. 5 shows a partial cross-section view of the pushing mechanism of FIG. 1.
Figure 6:
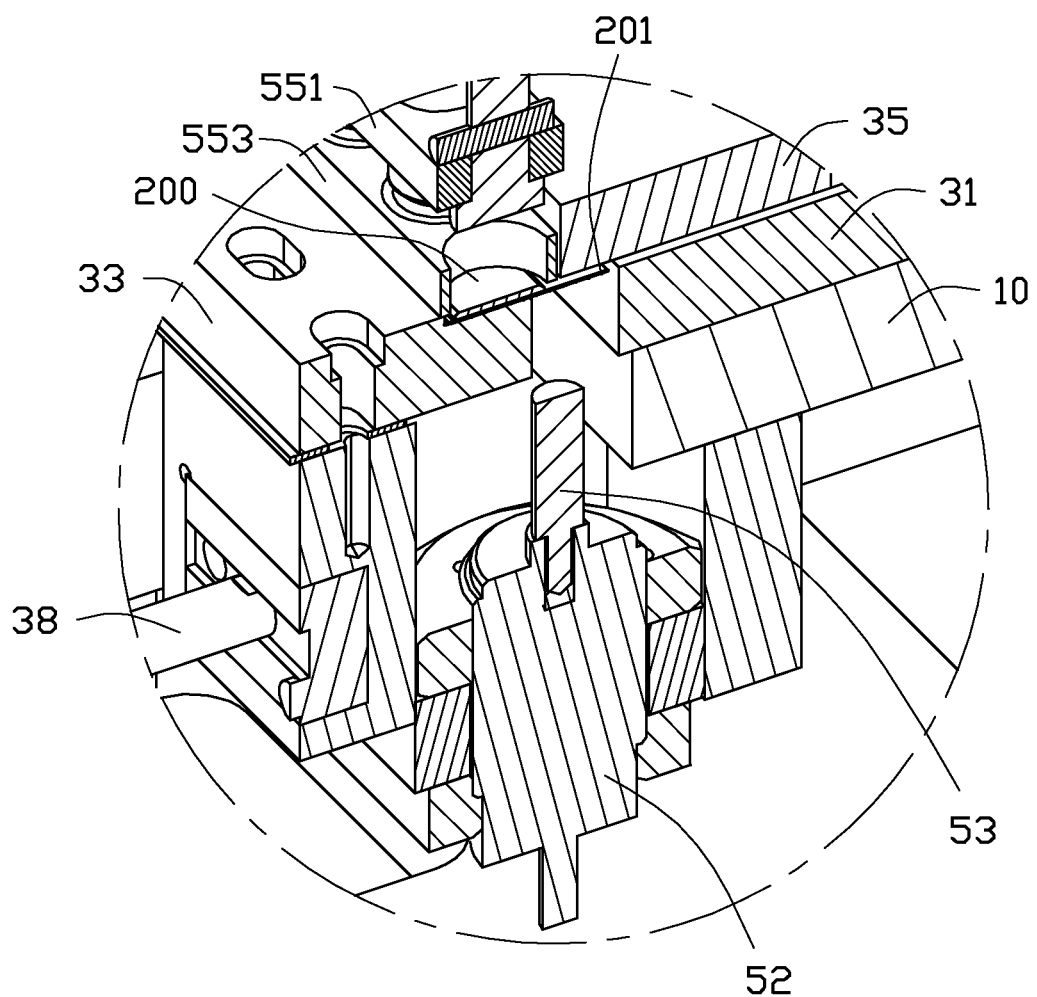
FIG. 6 shows an enlarged view of a VI area of the pushing mechanism of FIG. 5.

FIGS. 5 and 6 show that the stripping mechanism 50 includes a bracket 51 (as shown in FIGS. 1 and 2), a driving member 52, a pushing member 53, and two sucking assemblies 55. The bracket 51 movably passes through the base 10. The bracket 51 includes a bottom board 511, three supporting pillars 513 separately protruding from the bottom board 511, and a mounting board 515. The bottom board 511 is positioned under the base 10. Each supporting pillar 513 movably passes through corresponding one guiding hole 312. The mounting board 515 is fixedly connected to the supporting pillars 513 away from the bottom board 511. The driving member 52 is mounted on the second installation surface 13 adjacent to the through hole 113. The pushing member 53 is connected to the driving member 52 towards the first and second recessing grooves 315, 3311, for engaging with the resisting member 35 to strip the release paper 201. The pushing member 53 can extend through the first and second recessing grooves 315, 3311 to make the release paper 201 be clamped between the pushing member 53 and the resisting member 35.

The two sucking assemblies 55 are separately mounted on the mounting board 515 above the slider 33. Each suction assembly 55 includes an suction driving member 551 and an suction member 553. The suction driving member 551 is mounted on the mounting board 515 away from the supporting pillar 513. The suction member 553 is connected to the suction driving members 551 above the slider 33, for sucking one side surface of the workpiece 200 and moving the workpiece 200 relative to the resisting member 35.

FIGS. 1 and 2 show that the transporting mechanism 70 is mounted on the base 10. The transporting mechanism 70 includes a third driver 71, a first buffer member 73, and a second buffer member 75. The third driver 71 is positioned on the second installation surface 13 and is connected to the bottom board 511, moving the stripping mechanism 50 relative to the base 10. The first buffer member 73 is positioned on the second installation surface 13 and abuts the third driver 71. The second buffer member 75 mounted on the second installation surface 13 opposite to the first buffer member 73.

In assembly, one pushing mechanism 30 is firstly assembled to the base 10 with the following steps: The supporting members 31, the guiding rails 32 are mounted on the base 10. The slider 33 is positioned on the two guiding rails 32. The guiding member 34 is fixed on the supporting member 31. The resisting member 35 is installed on the supporting member 31 adjacent to the guiding member 34 above the first and second recessing grooves 315, 3311. Each pushing post 373 passes through one penetrating hole 313. Then one pushing mechanism 30 is assembled to the base 10, and the other pushing mechanism 30 is assembled with the same steps. The bracket 51 is assembled with the base 10. The driving member 52 is fixedly connected to the base 10. The pushing member 53 is connected to the driving member 52 under the through hole 113. The two suction driving members 55 are mounted on the mounting board 515 away from the supporting pillars 513. The suction members are connected to the two suction driving members 55. The third driver 71 is positioned on the second installation surface 13 and is connected to the bottom board 511. The first buffer member 73 is positioned on the second installation surface 13. The second buffer member 75 mounted on the second installation surface 13 opposite to the first buffer member 73.

In use, one workpiece 200 is received in the receiving portion 341 and drops into the first guiding groove 312. The pushing posts 373 push the workpiece 200 to the second guiding groove 331 (as shown in FIG. 4). The release paper 201 is above the first and second recessing grooves 315, 3311. The driving member 52 drives the pushing member 53 to extend through the penetrating hole 113, the first and second recessing grooves 315, 3311 to clamp the release paper 201 between the pushing member 53 and the resisting member 35. The suction members 553 suck the workpiece 200 and move relative to the base 10, such that the release paper 201 is stripped off. The third driver 71 drives the bracket 51 to move relative to the base 10, transporting the workpiece 200 to the next workstation. The first buffer member 73 resists the bottom board 511 and the second driver 38 drives the slider 33 slide along the guiding rails 32. The pushing member 53 releases the release paper 201, such that the release paper 53 slides into the bottom board 511 via the through hole 113. The bracket 51 returns to the original position and resists against the second buffer member 75.

As described above, the stripping mechanism 50 engages with the pushing mechanisms 30 to clamp a part of the release paper 201 between the stripping mechanism 50 and the pushing mechanisms 30. The suction members 553 suck the workpiece 200 and moves the workpiece 200 relative to the base 10, such that the release paper 201 is stripped off from the workpiece 200 automatically.

In other embodiments, the number of the pushing mechanisms 30 is not limited to two, it can be one, three or more. The number of the supporting pillars 513 is not limited to three, it can be one, two or more, and the number of the guiding holes 312 corresponds to the number of the supporting pillars 513. The number of the pushing members 373 of each first driver 37 is not limited to two, it can be one, three or more, and the number of the penetrating holes 313 corresponds to the number of the pushing members 373. The guiding holes 112 can be omitted, the transporting mechanism 70 can be directly mounted on the first installation surface 11, and the bracket 51 is mounted on the first installation surface 11 with other forms to support the two adsorbing assemblies 55. The transporting mechanism 70 can be omitted, and the workpiece 200 can be transported by labor or other structures.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. An apparatus configured for stripping release paper from workpiece, comprising:
a base defining a through hole;
a pushing mechanism mounted on the base and abutting the through hole; and
a stripping mechanism mounted on the base, the stripping mechanism comprising a bracket mounted on the base, a driving member mounted on the base distant from the pushing mechanism and abutting the through hole, a pushing member connected to the driving member facing the through hole, and a suction assembly, wherein the suction assembly comprises a suction driving member fixedly-connected to the bracket and a suction member connected to the suction driving member, wherein the driving member enables the pushing member to extend into the through hole for clamping the release paper between the pushing member and the pushing mechanism, and the suction member is capable of sucking and moving the workpiece, for stripping the release paper off from the workpiece.

2. The apparatus of claim 1, wherein the base comprises a first installation surface and a second installation surface, the through hole is defined through the first installation surface and the second installation surface, the bracket is mounted on the first installation surface, the driving member is mounted on the second installation surface and positioned adjacent to the through hole.

3. The apparatus of claim 1, wherein the pushing mechanism comprises a supporting member, a guiding member, and a resisting member, the supporting member is fixedly installed on the base, the guiding member is fixedly positioned on the supporting member, and the resisting member is fixedly mounted on the supporting member adjacent to the guiding member to engage with the pushing member for clamping the release paper.

4. The apparatus of claim 3, wherein the guiding member comprises a receiving portion defined in the guiding member for receiving the workpiece, the supporting member defines a first guiding groove distant from the base, and the receiving portion communicates with the first guiding groove.

5. The apparatus of claim 4, wherein the pushing mechanism further comprises two guiding rails and a slider, the two guiding rails are mounted on the base adjacent to the supporting member and respectively positioned at two sides of the through hole, the slider is movably mounted on the two guiding rails above the through hole.

6. The apparatus of claim 5, wherein the slider defines a second guiding groove communicating with the first guiding groove.

7. The apparatus of claim 6, wherein the supporting member defines a first recessing groove communicating with the first guiding groove, the slider defines a second recessing groove corresponding to the first recessing groove, the first recessing groove and the second recessing groove communicate with the through hole.

8. The apparatus of claim 7, wherein the pushing mechanism further comprises a first driver, the first driver comprises a driving body and two pushing posts, the supporting member defines two penetrating holes communicating with the first guiding groove, the two pushing posts pass through the two penetrating holes respectively to push the workpiece to the second recess groove.

9. The apparatus of claim 5, wherein the pushing mechanism further comprises a first driver and a second driver, the first driver is fixed on the base and positioned at one side of the supporting member distant from the slider, the second driver is mounted on the base and connected to the slider for moving the slider along the guiding rails.

10. The apparatus of claim 1, wherein the stripping device further comprises a transporting mechanism mounted on the base distant from the pushing mechanism and connected to the bracket.

11. The apparatus of claim 10, wherein the base defines a guiding hole adjacent to the through hole, the bracket comprises a bottom board, a supporting pillar protruding from the bottom board, and a mounting board connected to the supporting pillar distant from the bottom board, the supporting pillar passes through the guiding hole, the bottom board and the mounting board are positioned at two sides of the base, and the mounting board is positioned adjacent to the pushing mechanism, the suction driving member is mounted on the mounting board, and the transporting mechanism is connected to the bottom board.

12. The apparatus of claim 11, wherein the transporting mechanism comprises a third driver, a first buffer member, and a second buffer member, the third driver is mounted on the base distant from the pushing mechanism and connected to the bottom board, the first buffer member is positioned on the base and abuts the third driver, the second buffer member is positioned on the base opposite to the first buffer member.

* * * * *